United States Patent

[11] 3,607,919

[72] Inventor Bruno J. Barone
 Houston, Tex.
[21] Appl. No. 617,803
[22] Filed Feb. 23, 1967
[45] Patented Sept. 21, 1971
[73] Assignee Petro-Tex Chemical Corporation
 Houston, Tex.

[54] PROCESS FOR THE OXIDATION OF AROMATIC COMPOUNDS
 16 Claims, No Drawings
[52] U.S. Cl. .................................................... 260/524 R,
 260/523 R
[51] Int. Cl. ........................................................ C07c 63/02
[50] Field of Search .......................................... 260/524

[56] References Cited
UNITED STATES PATENTS

| | | | |
|---|---|---|---|
| 3,299,125 | 1/1967 | Ichikawa ...................... | 260/524 |
| 2,853,514 | 9/1958 | Brill ............................. | 260/524 |

Primary Examiner—Lorraine A. Weinberger
Assistant Examiner—R. S. Weissberg
Attorney—G. Baxter Dunaway

ABSTRACT: A process for the oxidation of mono nuclear aromatic compounds having at least one methyl nuclear substituent in the presence of oxygen, cobaltous or cobaltic ion, at 60° C. to 150° C. and atmospheric pressure or greater, and characterized by the addition of an initiator at the period of maximum oxygen uptake in the course of reduction. The use of particular cocatalysts such as zirconium, columbium, and lanthanum is contemplated.

PROCESS FOR THE OXIDATION OF AROMATIC COMPOUNDS

BACKGROUND OF THE INVENTION

This invention relates to the oxidation of aromatic compounds characterized by a single aryl group having at least one methyl nuclear substituent. More particularly, the invention relates to an improved process for the efficient and economical conversion of suitable methyl and dimethyl substituted monoaryl compounds to aromatic monobasic and dibasic acids.

Earlier studies in this field have evolved a variety of proposed processes for the catalytic liquid phase oxidation of alkylated aromatic compounds in the presence or absence of a solvent by means of air or oxygen using various metals or salts thereof as catalysts. A number of classes of organic compounds, such as peroxides, aldehydes, and ketones have been proposed and utilized as reaction initiators or activators.

In general, many prior art processes involve inherent disadvantages, the principal defect being the conversion of only a small fraction, usually much less than half, of the feedstock even after lengthy reaction periods. Additional problems are the simultaneous formation of other oxidized products, the removal of which may be difficult and requires additional steps and expense and the requirement for reaction conditions involving high temperature or high pressure or both. Where the desired product was a dibasic acid, the prior art process generally required successive steps, as for example, first the conversion of xylene to toluic acid and then the oxidation of the latter under more drastic conditions to the corresponding dibasic acid.

Briefly, the course of the reaction concerning the oxidation of aromatic hydrocarbons to mono or dibasic acids is as follows. The hydrocarbon is combined with a given amount of an acid medium, an ion such as cobalt ion, and is heated to a temperature of between 60° C. and 150° C. in the presence of oxygen. The reaction begins slowly, in some cases, having an induction period of as much as 4 or 5 hours. At a point somewhere between 4 and 7 hours, for example, the oxygen uptake by the system begins to increase markedly and the system goes through a period which may be referred to as its period of maximum rate of oxidation. This phenomena is present even in those systems which require the use of initiators such as aldehydes or ketones at the beginning of the reaction.

SUMMARY OF THE INVENTION

It has been found that improved rates of reaction and improved yields result when an initiator such as an aldehyde or a ketone is apportioned into the reaction mixture at a specified period during the course of the reaction. Best results occur, regardless of the other catalysts present, if the bulk or major portion of the initiator is added into the system during the period of maximum oxygen uptake, i.e., the period of maximum rate of oxidation in the system. The period of maximum rate of oxidation occurs in the course of the reaction after about 15 percent of the theoretical amount of oxygen has been absorbed, and before about 65 percent of the theoretical amount of oxygen has been absorbed. A preferred embodiment is the injection of about one-tenth to about four-tenths of the amount of the initiator to be used at the beginning of the reaction and then the injection of the remainder of the initiator during the period of maximum oxygen uptake. A most preferred ratio is the addition of about one-fourth to three-eighths of the total amount of initiator at the beginning of the reaction, the balance, of course, being added during the period of maximum oxygen uptake.

PREFERRED EMBODIMENTS

Accordingly, the invention comprises reacting a methyl or dimethyl substituted monoaryl compound in a monocarboxylic acid selected from the group consisting of aliphatic acids having two to six carbon atoms and aryl aliphatic acids having from eight to 12 carbon atoms, at a concentration of 0.3 to 2 molar, with oxygen at a temperature of from 60° C. to 150° C. at atmospheric pressure or greater, and in the presence of from 0.3 to 24 grams per liter cobaltous or cobaltic ion, or mixtures thereof, and optionally, in the presence of catalytically active amounts of a metal ion cocatalyst as more particularly hereinafter described, and 0.1 to 0.5 mol per liter of an initiator comprising or consisting of a ketone or an aldehyde which is apportioned to provide at least the greater part of the initiator at the period during the course of the reaction that the reaction system experiences its maximum rate of oxidation or oxygen uptake. Typical starting materials are methyl or dimethyl substituted benzenes such as toluene, $m$-xylene, $p$-xylene, or mixtures containing such compounds. The aromatic starting material may contain, in addition to a methyl group or groups, other nuclear substituents inert to the oxidation reaction, such as chlorine, bromine, fluorine, nitro, carboxyl, alkoxy, aryloxy, or tertiary alkyl groups. Typical conversions include toluene to benzoic acid, $m$-xylene or $m$-toluic acid to isophthalic acid, $p$-xylene or $p$-toluic acid to terephthalic acid, 1,4-dimethyl-2-chlorobenzene to chloroterephthalic acid, and 1,4-dimethyl-2nitrobenzene to nitroterephthalic acid. Additional conversions attainable by the present invention include conversion of terephthaldehyde and $p$-tolualdehyde to terephthalic acid, isophthalic aldehyde to isophthalic acid, and benzaldehyde to benzoic acid.

As noted above, either cobaltous or cobaltic ion (or both) must be present in amount corresponding to the initial provision of a cobalt salt soluble in the above solution, such as cobaltous acetate, propionate, or butyrate, to the extent of about 0.3 to 24 grams of cobaltous or cobaltic ions per liter of solution, although an amount of from about 0.4 to 15 grams is preferred. Thus, with the use of a 1 molar solution of the starting aromatic compound in acetic acid, the desired catalyst concentration may be supplied by the initial provision of about 0.03 to 0.20 mol of cobaltous acetate per liter of solution. Examples of cobaltous compounds which may be utilized are $Co(OAC)_2 \cdot 4H_2O$, cobaltous chloride, cobaltous acetylacetonate, etc., while cobaltic compounds are exemplified by cobaltic acetylacetonate and cobaltic acetate.

A small amount of water is preferred in the system, e.g., 0.001 to 0.02 mol per liter of the monocarboxylic acid media, more particularly hereinafter described, in order to reduce the induction period and to insure complete solubility of the cobalt compound. Water need not be used with the acetylacetonates. The water may be introduced directly or by the use of hydrated materials; however, excess water kills the reaction.

Suitable temperatures for the oxidation process in accordance with this invention are within the range of 60° C. to about 120° C. at atmospheric pressure, although temperatures up to about 150° C. may at times be used with somewhat higher pressures up to about 50 atmospheres. The preferred operating temperatures are within the range of 80° C. to 110° C.

While air is the most economical source of oxygen, any suitable oxygen-containing gas such as pure oxygen, ozone, or mixtures of such gases with inert gaseous diluents may be employed. It will, of course, be understood that in oxidizing substituted aromatic compounds in accordance with the invention, the oxygen supplied by continuous introduction of air or other oxygen-containing gas, as explained above, is the fundamental source of oxygen for the oxidation reaction, and sufficient oxygen must be supplied to complete the reaction.

Certain metallic elements are effective, in conjunction with the cobaltous or cobaltic ions, in improving the yields and/or rates of the reaction. In general, the metals of the Periodic Table having a valence greater than 1+, but having only a single valence or primary oxidation state, are effective in accomplishing increased yields and faster reaction rates. Exemplary are Be, Mg, Ca, Sr, Ba, Sc, Y, La, Zr, Ac, ac, Ta, Mo, W, Ru, Rh, Cd, Zn, B, Al, Ga, In, Nd, Pr, Gd, Tb, and Th and mixtures thereof. In addition to Ta, the other elements of Group Vb, i.e., V and Nb, and mixtures, show activity.[1]

[1] This group is based on the Periodic Table as found on pages 400-401 of the Handbook of Chemistry and Physics, 39th (1957-58) Edition, Chemical Rubber Publishing Company. Especially effective are Al, Zr, La, Nd, Zn, B, Mg and Nb. These elements, or mixtures thereof, may be in the form of salts, oxides, hydroxides and complexes, the only requirement being that sufficient amounts of the specified elements be present to provide a catalytic or effective amount of ions in the solution during the course of the reaction. For example, the metal ions may be added in the form of compounds or complexes such as the oxalates, the acetylacetonates, the alcoholates, the chlorides, the octoates, acetylacetates and the like. Salts of the lower fatty acids are especially useful, e.g., the acetates, propionates, the butyrates. The metals having a single or primary valence greater than 1+ should be present in amount of from 0.05 to 9.5 grams per liter. A preferred amount is from 0.05 to 4.9 grams per liter. The concentrations of the metals of Group Vb, other than tantalum, may be substantially less, e.g., on the order of 0.1 gram per liter to 1.75 grams per liter. In particular, effective results are obtained with niobium at a concentration of from 0.1 gram per liter to 1.0 gram per liter.

Suitable acid media for carrying out the reaction in the range set forth, as noted previously, are the monocarboxylic acids selected from the group consisting of aliphatic acids having 2 to 6 carbon atoms, mixtures thereof, and aryl aliphatic acids having from 8 to 12 carbon atoms, and mixtures thereof. Acetic acid is preferred, although such media as propionic, butyric, trimethyl acetic, phenyl acetic, and such hydroxy acids or derivatives as methoxy acetic, and the like, may be used.

As noted above, a significant feature of the invention is the employment of a ketone or aldehyde initiator to aid in the attack on the hydrocarbon molecule, especially at lower temperatures, during a specified period in the course of the reaction. The range of maximum uptake with a given system is determined by running the system experimentally or by monitoring the uptake of oxygen during the course of the reaction. Thus, the amount of oxygen uptake may be monitored until, for example, 50 percent of the theoretical amount of oxygen is absorbed, and then the initiator or remainder of the initiator may be added. The preferred initiators are paraldehyde and methyl ethyl ketone; however, other similar aldehydes and ketones may be utilized. In general, aldehydes and ketones of 3 to 10 carbon atoms are suitable. The aldehydes acetaldehyde, propionaldehyde, tolualdehyde and isobutyraldehyde, and the ketones diethyl ketone, methyl propyl ketone, and 2,5 hexanedione are particularly effective.

The quantities of initiator required in the present invention, as opposed to prior art methods, are significantly reduced. Whereas, e.g., one prior art process requires the initiator to be present in equimolar and substantially greater amounts in relation to the hydrocarbon, the quantity of initiator required in the present invention ranges from about 0.1 to 0.5 mol per liter of solution.

A preferred embodiment contemplates the addition of about one tenth to about four tenths of the total amount of initiator to be used at the beginning of the reaction, the balance being added during the period of maximum oxygen uptake in the system. In practice this works out to be in the range of from about 0.01 mol per liter to about 0.20 mol per liter added initially. A most preferred range for initial addition is from about 0.025 mol per liter to about 0.18 mol per liter. The remainder of the initiator, is added, as indicated, at the period of maximum oxygen uptake.

EXAMPLE I

An acetic acid solution containing 1.0 mol per liter p-xylene, 5.9 grams per liter cobaltous ion as cobalt acetate- tetrahydrate, 0.33 grams per liter zirconium ion as zirconium acetate, and 0.2 mol per liter paraldehyde was charged into a reactor provided with suitably valved gas inlet and outlet lines for admission of oxygen. The temperature of the reactor was held at 100 C. and the reaction carried out under atmospheric pressure. The reaction was killed at the end of 7 hours. The amount of p-xylene oxidized was 100 percent of that employed and gave a terephthalic acid yield of 92.9 percent.

EXAMPLE II

The procedure of Example I was repeated except that the paraldehyde was added during the course of the reaction where the maximum uptake of oxygen occurred. The reaction was killed after 7 hours, and an improved terephthalic acid yield of 94.6 percent was achieved.

EXAMPLE III IV

The procedure of Example I was repeated except that 0.23 gram per liter of columbium ion as columbium oxalate was used instead of the Zr ion, and 0.134 mol per liter of paraldehyde was added. Conversion of p-xylene was 99.5 percent for a yield of terephthalic acid after 8 hours of 86.8 percent.

EXAMPLE IV

The procedure of Example III was repeated except that the 0.134 mol per liter of paraldehyde was added over a 10 minute period at the maximum rate of uptake of oxygen. The conversion of p-xylene was 100 percent for a terephthalic acid yield after 8 hours of 93.4 percent.

EXAMPLE V

An acetic acid solution containing 1.0 mol per liter p-xylene, 5.9 grams per liter cobaltous ion as cobalt acetate tetrahydrate, and .066 mol per liter of methyl ethyl ketone, was charged into a reactor provided with suitably valved gas inlet and outlet lines for admission of oxygen. The temperature of the reactor was held at 100 C. and the reaction was carried out at atmospheric pressure. At a point during the period of maximum oxidation, about 0.134 mol per liter of methyl ethyl ketone was added over a period of 10 minutes. The yield of terephthalic acid was significantly greater about 9 hours reaction time than results obtained from a system without the initiator and results from a system containing the total amount of methyl ethyl ketone from the beginning of the reaction.

I claim:

1. A process for oxidizing mono aryl compounds having at least one methyl group comprising contacting in liquid phase in a monocarboxylic acid selected from the group consisting of aliphatic acids having from 2 to 6 carbon atoms and aryl aliphatic acids having from 8 to 12 carbon atoms, and mixtures thereof, 0.3 to 2 mols per liter of said mono aryl compound with oxygen, in the presence of from 0.3 to 24 grams per liter of a member selected from the group consisting of cobaltous ion, cobaltic ion, and mixtures thereof; continuing the contacting until a period of maximum oxygen uptake is reached and then adding about 0.1 to 0.5 mol per liter of an initiator comprising a ketone or an aldehyde having 3 to 10 carbon atoms, said contacting and said adding steps being carried out at a temperature of from 60 to 150° C. and a pressure of 1 atmosphere or greater.

2. The process of claim 1 wherein the contacting and adding steps are carried out additionally in the presence of catalytically effective amount of an ion or ions selected from the group consisting of Be, Mg, Ca, Sr, Ba, Se, Y, La, Zr, Hf, Ac, Ta, Mo, W, V, Ru, Rh, Cd, Zn, Al, Nb, Ga, In, Nd, Pr, Gd, Tb and Th.

3. The process of claim 2 wherein the ions of the metallic elements are present in an amount of from 0.05 to 9.5 grams per liter and are selected from the group consisting of elements of Group Vb of the Periodic Table and metallic elements having a valence greater than 1+, but having only a single valence, and the member selected from the group consisting of cobaltous ion, cobaltic ion, and mixtures thereof, is present in an amount of from 0.4 to 8 grams per liter.

4. The process of claim 2 wherein the additional ion is selected from the group consisting of Al, Zr, La, Nd, Zn, B, Nb, and Mg.

5. The process of claim 4 wherein the additional ion is Nb and is present in an amount of from 0.1 gram per liter to about 1.0 gram per liter.

6. The process of claim 3 wherein the monoaryl compound is *p*-xylene.

7. The process of claim 5 wherein there is present 0.001 to 0.01 mol of water per liter of the monocarboxylic acid present.

8. The process of claim 6 wherein therein is present 0.001 0.02 mol per liter of water per liter of the monocarboxylic acid present.

9. The process of claim 7 wherein the initiator is selected from the group consisting of paraldehyde and methyl ethyl ketone.

10. The process of claim 8 wherein the initiator is selected from the group consisting of paraldehyde and methyl ethyl ketone.

11. A process for oxidizing mono aryl compounds having at least one methyl group comprising contacting in liquid phase in an aliphatic acid of 2 to 6 carbon atoms 0.3 to 2 mols per liter of said mono aryl compound with oxygen, in the presence of from 0.3 to 24 grams per liter of a member selected from the group consisting of cobaltous ion, cobaltic ion, and mixtures thereof; a catalytically effective amount of an ion or ions selected from the group consisting of Al, Nb, Zr, La, Nd, Zn, B, and Mg, and a total of from about 0.1 to 0.5 mol per liter of an initiator comprising a ketone or an aldehyde; adding from 0.01 to 0.20 mol of the said initiator to the reaction initially and thereafter continuing the contacting until a period of maximum oxygen uptake is reached, then adding the remainder of said initiator to give the total of from 0.1 to 0.5 mol per liter, and continuing the reaction to achieve improved yields, said contacting, adding, and continuing steps being carried out at a temperature of from 60 to 150° C. and a pressure of one atmosphere or greater.

12. The process of claim 11 wherein the member selected from the group consisting of cobaltous ion, cobaltic ion, and mixtures thereof, is present in an amount of from 0.4 to 8 grams per liter.

13. The process of claim 11 wherein there is present 0.001 to 0.02 mol of water per liter of acetic acid.

14. The process of claim 11 wherein the additional ion is Nb and is present in an amount of from 0.1 gram per litre to about 1.0 gram per liter.

15. The process of claim 11 wherein the monaryl compound is *p*-xylene.

16. The process of claim 11 wherein the initiator is selected from the group consisting of paraldehyde and methyl ethyl ketone.

PO-1050
(5/69)

UNITED STATES PATENT OFFICE
CERTIFICATE OF CORRECTION

Patent No. 3,607,919      Dated September 21, 1971

Inventor(s) Bruno J. Barone

It is certified that error appears in the above-identified patent and that said Letters Patent are hereby corrected as shown below:

Col. 2, line 74, reads "Ac, ac" but should read ---Hf, Ac---

Col. 3, line 5 after "Company" footnote should end; Line 10 reads "compoinds" should read ---compounds---

Col. 4, line 10 reads Example "III IV" should read ---III---; Line 37 reads "greater about" should read ---greater after about---

Col. 5, Claim 7 reads "0.01" should read ---0.02---; Claim 8 reads "0.001 0.02" should read ---0.001 to 0.02"

Signed and sealed this 25th day of April 1972.

(SEAL)
Attest:

EDWARD M. FLETCHER, JR.
Attesting Officer

ROBERT GOTTSCHALK
Commissioner of Patents